UNITED STATES PATENT OFFICE.

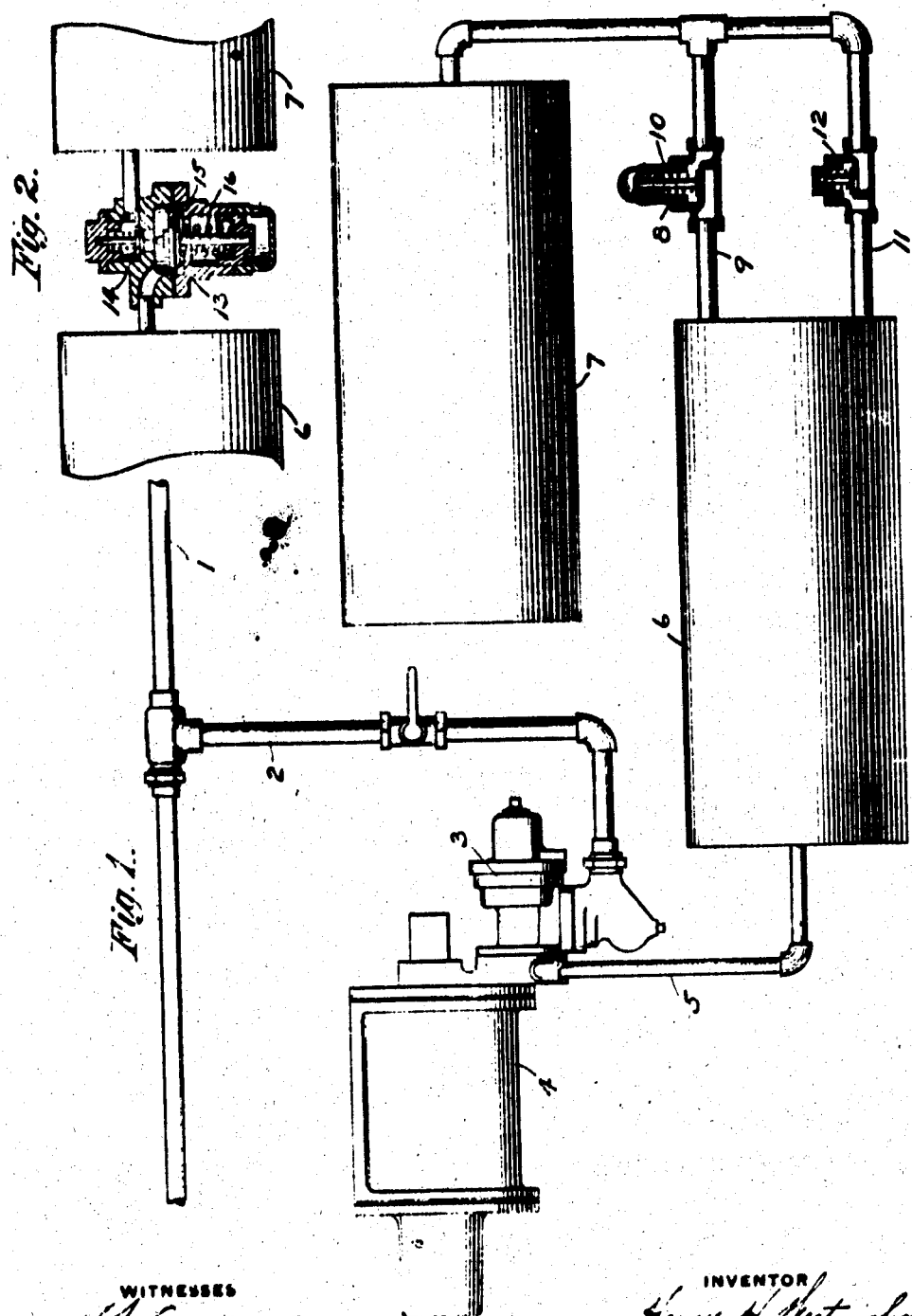

HENRY H. WESTINGHOUSE, OF NEW YORK, N. Y., ASSIGNOR TO THE WESTINGHOUSE AIR BRAKE COMPANY, OF PITTSBURG, PENNSYLVANIA, A CORPORATION OF PENNSYLVANIA.

AIR-BRAKE.

No. 841,750.     Specification of Letters Patent.     Patented Jan. 22, 1907.

Application filed April 16, 1904. Serial No. 203,407.

*To all whom it may concern:*

Be it known that I, HENRY H. WESTINGHOUSE, a citizen of the United States, residing in New York city, county and State of New York, have invented a certain new and useful Improvement in Air-Brakes, of which the following is a specification.

This invention relates in general to air-brakes for railway-cars, and more particularly to the automatic air-brake system in which each car is provided with a train-pipe, auxiliary reservoir, triple valve, and brake-cylinder, the triple valve being operated by reductions in train-pipe pressure for supplying air from the auxiliary reservoir to the brake-cylinder.

With the present standard equipment in the operation of trains down long grades, where it is necessary to hold the brakes applied for comparatively long periods of time, it also becomes necessary to make further and successive reductions in train-pipe pressure for the purpose of replenishing the brake-cylinder from the auxiliary reservoir in order to compensate for the leakage therefrom. In this way the pressure in the auxiliary reservoir is in a short time so far reduced as to be ineffectual. Also whenever a full-service application be made—that is, one in which the auxiliary-reservoir pressure is equalized with that of the brake-cylinder—any further leakage draws from both the brake-cylinder and auxiliary reservoir, and thereby diminishes the braking-pressure. With some equipments where slack-take-up devices are employed the auxiliary reservoir is made of comparatively small capacity, in order to secure the desired brake-cylinder pressure corresponding to certain reductons in train-pipe pressure where the travel of the brake-piston is short and also for the purpose of facilitating the release, and when a full-service application is made it will readily be seen that the braking-pressure may be rapidly diminshed by leakage from the brake-cylinder owing to the small capacity of the auxiliary reservoir. It is therefore desirable to provide some means for reinforcing or replenishing the auxiliary reservoir and brake-cylinder in full-service applications of the brakes or when the auxiliary reservoir pressure has been reduced a certain amount in order that the braking-pressure may be maintained substantially at that point for a considerable period of time, and this constitutes the main object of my invention.

My invention therefore comprises means for reinforcing or supplying air to the auxiliary reservoir from an additional source, such as a supplemental or storage reservoir, when the pressure in the auxiliary reservoir is reduced a predetermined amount, or substantially to the equalizing-point, as in a full-service application of the brakes.

In the accompanying drawings, Figure 1 shows diagrammatically a car equipment of an automatic air-brake apparatus with one form of my improvement applied thereto, and Fig. 2 shows a modification.

The train-pipe 1 is provided with a branch pipe 2, leading to the triple valve 3, which is connected to the brake-cylinder 4 and by pipe 5 to the auxiliary reservoir 6, all of which may be of the ordinary standard construction. In addition thereto I provide an additional source of air-pressure, such as a supplemental storage reservoir 7, which may be charged in any desired manner and provided with means for reinforcing the auxiliary reservoir when the pressure therein is reduced a predetermined amount below normal. As shown in Fig. 1, the supplemental reservoir is charged through a reducing or excess-pressure valve 8, which may be located in a passage or pipe 9, leading from the auxiliary reservoir to the supplemental reservoir, the valve having an adjustable load device, such as a spring 10, which may be set to give any desired difference between the pressures of the auxiliary reservoir and the supplemental reservoir when the same are both charged to normal maximum pressure. The supplemental reservoir also communicates with the auxiliary reservoir through a separate pipe connection 11, containing check-valve 12, which opens toward the auxiliary reservoir to permit the reinforcing of the auxiliary reservoir with air from the supplemental reservoir when the pressure in the auxiliary reservoir falls below that stored in the supplemental reservoir.

Considering the train-pipe and auxiliary reservoir as charged to the normal standard pressure of seventy pounds per square inch and the spring 10 being adjusted to equal about twenty pounds air-pressure per square inch, or approximately the difference between the normal standard pressure and that of the brake-cylinder and auxiliary reservoir in a full-service application of the brakes, the supplemental reservoir will then be charged to a pressure of substantially fifty pounds per square inch, which pressure will be stored in the supplemental reservoir and have no effect in the ordinary operation of the brakes. When, however, a full-service application is made in which the auxiliary-reservoir pressure equalizes with the brake-cylinder at a pressure below fifty pounds, or if for any other reason the pressure in the auxiliary reservoir is reduced below that stored in the supplemental reservoir, air will then flow from the supplemental reservoir through the check-valve to the auxiliary reservoir and reinforce the same to the extent of the capacity of the supplemental reservoir, so that any further leakage which draws from the auxiliary reservoir will also draw from the supplemental reservoir, which constitutes practically an enlargement of the auxiliary reservoir for all pressures below that stored in said supplemental reservoir. As the capacity of the supplemental reservoir may be made anything desired, it will be seen that an ordinary brake-cylinder leak would not be sufficient to reduce the pressure of the combined capacities of the auxiliary reservoir and supplemental reservoir except at a very slow rate, so that an efficient braking-pressure would be maintained in the brake-cylinder for a comparatively long period of time or until it should be desired to release the same.

According to the modification shown in Fig. 2 the supplemental reservoir is charged to the same standard normal pressure as the auxiliary reservoir, and a pressure-reducing-valve device 13 is inserted in the pipe or passage leading from the supplemental reservoir to the auxiliary-reservoir, the reducing-valve device having a diaphragm 15 subject to the auxiliary-reservoir pressure, and an opposing spring 16 adjusted to allow the valve 14 to close at all pressures above a predetermined amount, such as fifty pounds per square inch, to prevent flow from the supplemental reservoir to the auxiliary reservoir, but adapted to open when the auxiliary-reservoir pressure is reduced below this amount, and thereby maintain the auxiliary-reservoir and brake-cylinder pressure at substantially this point. As shown in this modification, the supplemental reservoir is charged from the auxiliary reservoir by the air raising the valve 14, which acts as a check-valve and permits the air to flow from the auxiliary reservoir to the supplemental reservoir, thereby dispensing with any additional connections. It will also be evident that in the construction shown in Fig. 2 the supplemental reservoir or supply-chamber may be charged in any convenient manner and to any higher degree of pressure that may be desired.

It will now be apparent that by means of my improvement the undesirable depletion of the braking power after full-service or successive applications may be prevented and a sufficient volume of air under pressure will always be at hand to safely control the speed of the car or train.

Having now described my invention, what I claim as new, and desire to secure by Letters Patent, is—

1. In an air-brake, the combination with a train-pipe, auxiliary reservoir, triple valve, and brake-cylinder, of an additional source of pressure, and means operated by a reduction in the auxiliary-reservoir pressure to the equalizing-point for supplying air from the additional source to the auxiliary reservoir.

2. In an air-brake, the combination with a train-pipe, auxiliary reservoir, triple valve and brake-cylinder, of an additional source of pressure, such as a supplemental reservoir, and means for supplying air from the supplemental reservoir to the auxiliary reservoir when the pressure in the latter is reduced to substantially the equalizing-point.

3. In an air-brake, the combination with a train-pipe, auxiliary reservoir, triple valve and brake-cylinder, of a supplemental reservoir, means for charging the same to a degree of pressure substantially equal to the normal pressure of the auxiliary reservoir, and means for establishing communication from the supplemental reservoir to the auxiliary reservoir when the pressure in the latter falls to a predetermined point.

4. In an air-brake, the combination with a train-pipe, auxiliary reservoir, triple valve and brake-cylinder, of a supplemental reservoir, a passage for supplying air to the same, and a valve device operated by a reduction in the auxiliary-reservoir pressure to substantially the equalizing-point, for opening communication from the supplemental reservoir to the auxiliary reservoir.

5. In an air-brake, the combination with a train-pipe, auxiliary reservoir, triple valve and brake-cylinder, of an additional source of pressure, such as a supplemental reservoir, a passage leading from the supplemental reservoir to the auxiliary reservoir, and a reducing-valve device having a diaphragm governed by the auxiliary reservoir pressure for controlling said passage.

6. In an air-brake, the combination with a train-pipe, auxiliary reservoir, triple valve and brake-cylinder, of a supplemental reservoir, means for supplying air from the auxiliary reservoir to the supplemental reservoir, a passage leading from the supplemental reservoir to the auxiliary reservoir, and a reducing-valve device having a diaphragm governed by the auxiliary-reservoir pressure for controlling said passage.

In testimony whereof I have hereunto set my hand.

HENRY H. WESTINGHOUSE.

Witnesses:
R. F. EMERY,
JAS. B. MACDONALD.